(12) United States Patent
Zettwoch (10) Patent No.: US 7,729,374 B2
(45) Date of Patent: *Jun. 1, 2010

(54) FIBRE CHANNEL INTERFACE APPARATUS AND METHODS

(75) Inventor: Robert Neal Zettwoch, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 694 days.

This patent is subject to a terminal disclaimer.

(21) Appl. No.: 10/930,973

(22) Filed: Aug. 31, 2004

(65) Prior Publication Data

US 2005/0058126 A1    Mar. 17, 2005

Related U.S. Application Data

(63) Continuation-in-part of application No. 10/745,045, filed on Dec. 23, 2003, which is a continuation-in-part of application No. 10/650,597, filed on Aug. 28, 2003.

(51) Int. Cl.
*H04J 3/16* (2006.01)

(52) U.S. Cl. ...................... 370/466; 370/537

(58) Field of Classification Search ................. 370/205, 370/464–467, 516, 521, 537–541, 535; 375/241–254; 709/247

See application file for complete search history.

(56) References Cited

U.S. PATENT DOCUMENTS

| | | | |
|---|---|---|---|
| 4,556,284 A | 12/1985 | Albersdoerfer et al. | |
| 4,933,929 A | 6/1990 | Tajima | |
| 5,394,265 A | 2/1995 | Nagel et al. | |
| 5,481,399 A | 1/1996 | Nagel et al. | |
| 5,953,139 A | 9/1999 | Nemecek et al. | |
| 5,963,567 A | 10/1999 | Veselka et al. | |
| 6,005,702 A | 12/1999 | Suzuki et al. | |
| 6,023,362 A | 2/2000 | Walker et al. | |
| 6,111,675 A | 8/2000 | Mao et al. | |
| 6,215,789 B1 * | 4/2001 | Keenan et al. | 370/399 |
| 6,252,693 B1 | 6/2001 | Blauvelt | |
| 6,307,859 B1 * | 10/2001 | Tedenstig | 370/401 |
| 6,310,709 B1 | 10/2001 | Bergano | |
| 6,324,334 B1 * | 11/2001 | Morioka et al. | 386/52 |
| 6,343,217 B1 * | 1/2002 | Borland | 375/243 |
| 6,441,950 B1 | 8/2002 | Chen et al. | |
| 6,549,311 B1 | 4/2003 | Hakki et al. | |
| 6,556,965 B1 * | 4/2003 | Borland et al. | 704/200.1 |
| 6,561,454 B1 * | 5/2003 | White, III | 244/1 R |
| 2001/0015968 A1 * | 8/2001 | Sicher et al. | 370/352 |
| 2003/0013465 A1 * | 1/2003 | Choong et al. | 455/466 |
| 2004/0010729 A1 * | 1/2004 | Lockridge et al. | 713/500 |
| 2007/0016694 A1 * | 1/2007 | Achler | 709/247 |

* cited by examiner

Primary Examiner—Ricky Ngo
Assistant Examiner—Pao Sinkantarakorn (57) ABSTRACT

Fibre channel interface apparatus and methods are disclosed. In one embodiment, a system includes at least one input interface adapted to receive one or more frames of data, the frames of data being at least one of transmitted and received at a node of a fibre channel network, and an output interface adapted to provide the received one or more frames of data to a device. The device may comprise a radar system, such as an electronically-scanned radar system. In a further embodiment, the system is adapted to combine multiple data streams of the fibre channel network by a method including encoding the first and second data streams of the fibre channel network, and merging the encoded first and second data streams into a plurality of frames.

24 Claims, 8 Drawing Sheets

FIBRE CHANNEL INTERFACE APPARATUS AND METHODS

CROSS REFERENCE TO RELATED APPLICATIONS

This patent application is a continuation-in-part of co-pending, commonly-owned U.S. patent application Ser. No. 10/745,045 entitled "Encoding and Merging Multiple Data Streams of Fibre Channel Network," filed on Dec. 23, 2003, which is a continuation-in-part of co-pending, commonly-owned U.S. patent application Ser. No. 10/650,597 entitled "Fibre Channel Interface Unit," filed on Aug. 28, 2003, which applications are hereby incorporated by reference.

FIELD OF THE INVENTION

The present disclosure relates generally to network interfaces, and more specifically, to fibre channel network interfaces within avionics systems, including advanced radar systems.

BACKGROUND OF THE INVENTION

In many applications, electronic equipment is interconnected and communicates via a network. An example of electronic equipment interconnected in a network includes avionics, such as a radar system, on an aircraft. To accommodate performance enhancements and their associated increase in data requirements, advanced systems may include a fibre channel network. Each node on a network can simultaneously transmit and receive according to a full duplex transmit-receive protocol. For example, each data word may include 32 bits and each frame up to 528 data words. Each frame as part of a sequence and the sequences can be part of different exchanges. Therefore, one frame may be out of context without the other frames from the same sequence of an exchange.

Fibre channel networks may include switches to enable communication to occur simultaneously between two nodes, such as a four-port fibre channel switch. With multiple switches, multiple paths can be found and, therefore, variable frame delays may result.

More specifically, in conventional fibre channel networks having multiple switches X, Y, and Z, and multiple nodes A and B, one communication path may become busy for an instant in time. This may cause a next frame in a sequence to be routed using another path, which can create different delays for each frame of a sequence. For example, the following sequence may be sent by the node A: FRAME #1, FRAME #2, FRAME #3, FRAME #4, FRAME #5, and FRAME #6. However, the sequence received by the node B may be as follows: FRAME #1, FRAME #3, FRAME #2, FRAME #5, FRAME #4, and FRAME #6. A lower level device driver of the receiving node may be responsible for reordering the frames back to the original order.

Although desirable results have been achieved using such prior art systems, there may be room for improvement. For example, it may be desirable to monitor and record data communicated within a fibre channel network. However, because multiple devices may be communicating simultaneously, and due to redundancy considerations, the monitoring and recording of networks having multiple switches may be complex and expensive to implement, and may entail intrusive modifications to hardware, such as providing special ports on switches. Furthermore, such monitoring may be time and labor intensive, and limited in applicability. Advanced apparatus and methods for fibre channel interface units and for methods of encoding and merging multiple data streams within fibre channel networks that at least partially mitigate these characteristics would be useful.

SUMMARY OF THE INVENTION

The present invention is directed to fibre channel interface apparatus and methods that may provide improved monitoring of multiple nodes of a fibre channel network, improved extraction of node-specific information, and improved communication of the node-specific information within fibre channel networks. Such apparatus and methods may have utility in a wide variety of systems that include fibre channel networks, such as aircraft avionics systems, including those having advanced radar systems.

In one embodiment, a system for interfacing with at least one node in a fibre channel network includes at least one input interface adapted to receive one or more frames of data, the frames of data being at least one of transmitted and received at a node of the fibre channel network, and an output interface adapted to provide the received one or more frames of data to a device. In alternate embodiments, the input interface and the output interface are programmable interfaces. In a further embodiment, the device comprises a radar system, such as an electronically-scanned radar system.

In a further embodiment, the system is adapted to combine multiple data streams of the fibre channel network by a method including encoding the first and second data streams of the fibre channel network, and merging the encoded first and second data streams into a plurality of frames. Alternately, the method further comprises creating packets of information from each of the first and second data streams, and adding identification information to each of the frames.

BRIEF DESCRIPTION OF THE DRAWINGS

Preferred and alternative embodiments of the present invention are described in detail below with reference to the following drawings.

DETAILED DESCRIPTION OF THE INVENTION

The present invention relates to fibre channel interface apparatus and methods. Many specific details of certain embodiments of the invention are set forth in the following description and in FIGS. 1-8 to provide a thorough understanding of such embodiments. One skilled in the art, however, will understand that the present invention may have additional embodiments, or that the present invention may be practiced without several of the details described in the following description.

By way of overview, in one embodiment in accordance with the present invention, a device is provided for interfacing with at least one node in a fibre channel network. The device includes at least one input interface that is couplable to receive a plurality of frames of data that are transmitted from or received at a node of the fibre channel network. An output telemetry interface is couplable to provide the received frames of data to a telemetry device.

Figure 1:
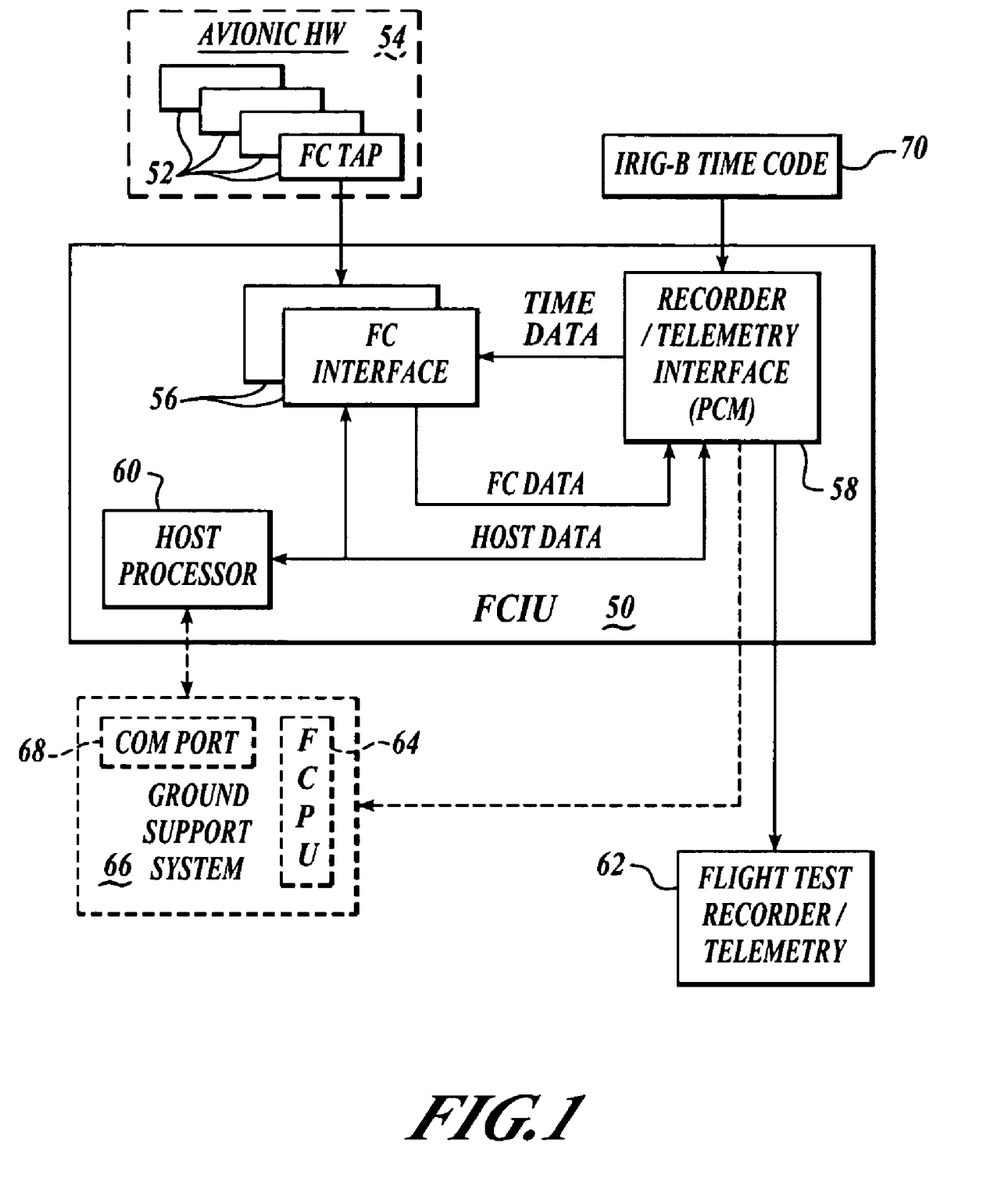
FIG. 1 is a block diagram of a fibre channel interface unit according to an embodiment of the present invention.

Referring now to FIG. 1, an exemplary, non-limiting fibre channel interface unit 50 is arranged to interface with at least one node 52 in a fibre channel network 54. The nodes 52 may suitably be any electronic units that are interconnected to communicate with each other in a fibre channel network. For example, the nodes 52 may include avionics hardware units in an aircraft.

Communications within the fibre channel network 54 may be conducted via frames of words. Advantageously, in some embodiments, the interface unit 50 is a passive listener to the communications within the fibre channel network 54. Therefore, the interface unit 50 is configured to receive the frames of data words from the fibre channel network 54. A typical fibre channel frame that may be monitored by the interface unit 50 may include the following data words: start of frame; destination address; source address; frame control; sequence ID/frame count; exchange ID; parameter field; data block of payload word # 1 through payload word # M; cyclic redundancy check; and end of frame.

Within this frame context, the interface unit 50 may passively listen to communications within the fibre channel network 54 independently of upper layer protocol. It will be appreciated that in the fibre channel network 54, several sequences could be opened at the same time and could be intermixed in time. Further, frames can appear at their destination nodes 52 out of sequence. This helps to increase throughput within the fibre channel network 54 by keeping the nodes 52 of any switch busy. However, this can significantly complicate interpretation of a fibre channel message by instrumentation if the instrumentation must understand the upper level protocol in order to decide which messages to record or ignore. In this situation, the instrumentation would have to be capable of buffering the entire frame sequence before deciding if the message should be recorded. With a possibility of several sequences occurring simultaneously, an unlimited number of buffers might be entailed.

Advantageously, the interface unit 50 may operate like a switch in that the interface unit 50 may only interpret a correct destination address for routing. As a result, the interface unit 50 only uses a small amount of buffering. In addition, the interface unit 50 can also use the source address to determine if the frame should be recorded. With this basic operating principle in mind, details will now be set forth a non-limiting embodiment of the interface unit 50.

A high level architecture of the interface unit 50 will first be explained with reference to FIG. 1. Details of the interface unit 50 will be explained with reference to FIG. 2. Exemplary system environments and applications in which the interface unit 50 suitably are used will be explained with reference to FIGS. 3-5.

Referring now to FIG. 1, an exemplary embodiment of the interface unit 50 includes at least one input interface 56, an output interface 58, and a processor 60. The input interface 56 is coupled to receive the frames of data that are transmitted from or received at the node 52 of the fibre channel network 54. The input interface 56 provides the received frames of data to the output interface 58 that is, in turn, coupled to provide the received frames of data to a device 62, such as a telemetry device or a recorder. The processor 60 is coupled to program and control the input interface 56 and the output interface 58. In one embodiment, the interface unit 50 advantageously has a modular design in which the input interface 56, the output interface 58, and the processor 60 are provided as modules for performing input, output, and programming and control functions. As a result, new optional input or output configurations can be added as desired without impacting the entire design of the interface unit 50.

In one particular embodiment, the interface unit 50 includes two input interfaces 56, and each input interface 56 includes two fibre channel inputs. This configuration provides four fibre channel inputs into the interface unit 50. Advantageously, four fibre channel inputs permits the interface unit 50 to support a transmit and receive pair from two redundant switches in the fibre channel network 54.

The input interface 56 suitably may be an optical fibre channel transceiver with optical terminations that connect to the node 52. Alternately, the input interface 56 suitably may be an electrical fibre channel transceiver with an electrical termination. It will be appreciated that changing from an optical connection to an electrical connection advantageously does not entail any changes to the other components of the interface unit 50. Instead, changing from an optical connection to an electrical connection is only a matter of replacing optical terminations with electrical terminations.

Each of the input interfaces 56 may have an independent, programmable filter that may be adapted to capture all frames of data, or to thin input data based upon source address or destination address. Details of thinning will be explained below. If thinning is enabled, the interface unit 50 can either keep or filter the selected addresses in order to eliminate data that are not desired for a particular application. This can significantly reduce output recording bandwidth requirements.

Each of the input interfaces 56 can transmit a frame of data out of the interface unit 50 and have the frame of unit wrapped back into the input interface 56 using an external cable (not shown). This feature can be used to verify integrity of a cable link in the fibre channel network 54 without one of the specific nodes 52 being present.

In one presently preferred embodiment, the output interface is configured to provide the received frames of data in pulse code modulation (PCM) formatted frames. Advantageously, PCM provides a large number of processing options. For example, output from the output interface 58 can be merged onto the recorder or telemetry device 62 with other PCM streams using currently available combiners. Alternately, the output from the output interface 58 can be sent directly to the recorder or telemetry device 62.

The PCM format used by the output interface 58 in one representative embodiment is similar to IRIG-106, Chapter 8 for MIL-STD-1553 Mux-A11. However, in alternate embodiments, the serial output word size from the output interface 58 may be 36-bits instead of 24-bits. The 36-bit size may advantageously optimize overhead attached to each 32-bit Fibre Channel word. The output interface 58 can create up to 2 or more serial streams, each of which can have a baud rate up to 20 Mbps for a combined rate of 40 Mbps or more. In one embodiment, the 36-bit PCM format may support up to 4 fibre channel streams and could support embedded PCM, digital voice and the like. The output interface 58 may use a 40-bit format which is upward compatible with the 36-bit format and could accommodate up to 64 fibre channel streams. In one embodiment, the interface unit 50 includes a backplane that connects the input interface 56 and the output interface 58. The backplane advantageously has a throughput capacity of greater than two Gigabps. This throughput capacity enables the output rate of the interface unit 50 to be enhanced in the future by substituting the PCM output with an alternate interface when high-speed, large capacity recording devices mature.

Because the output stream advantageously is PCM-formatted, the output stream may be telemetered and recovered using standard decommutators to determine word boundaries. For example, in one embodiment, a Fibre Channel playback unit 64 is coupled to the output interface 58 and provides real-time monitoring of the interface unit 50. In another embodiment, the Fibre Channel playback unit 64 includes any suitable off-the-shelf processor and two standard decoms for accepting and merging the two PCM streams from the output interface 58. Alternately, non-real-time analysis may be performed by directly recovering data from media in the recorder 62 using software decommutators. For higher rate of recording requirements, the output interface 58 may include an 8-bit parallel output with rates up to at least 160 Mbps.

Advantageously, the output interface 58 may be programmed to use a "low fill" feature. In a normal mode of operation, if fibre channel data is not available, a "fill" word is added to the PCM frame to maintain a constant output frame rate from the output interface 58. In "low fill" mode, if fibre channel data is not available, the output interface 58 significantly lowers the frame rate by only adding a "fill" word to the frame at a predetermined time interval. In one exemplary embodiment, the predetermined interval is around 10 milliseconds. The "low-fill" feature keeps the PCM frames functioning such that fault isolation and activity information may be retrieved. The "low-fill" feature also advantageously conserves record storage space when there is no fibre channel activity.

The processor 60 controls the input interface 56 and the output interface 58. Programmable features of the input interface 56 and the output interface 58 may be programmed via the processor 60. Control and programming features of the processor 60 may be accessed by a user interface 66. The user interface 66 includes a communication (COM) port 68 that is coupled to the processor 60. In one exemplary embodiment, the COM port 68 suitably is a common RS-422 serial link for communication between the processor 60 and the user interface 66. In one exemplary embodiment, the user interface 66 may be a ground support system that includes the fibre channel playback unit 64. The ground support system is used by flight test personnel to control and program features of the interface unit 50 and to playback data in real-time when the interface unit 50 is installed in a fibre channel network on board an aircraft for monitoring flight test data.

Exemplary programmable features that may be controlled by the processor 60 suitably may include fibre channel filtering in the input interface 56 and PCM rate from the output interface 58. The processor 60 may also be used to determine a wide variety of conditions, including, for example, health of the interface unit 50, activity of the input interface 56, receipt of time codes, obtaining hardware configuration of the interface unit 50, modifying design of the interface unit 50 so features can be added without necessitating return of the interface unit 50 to the factory, and the like.

In one exemplary embodiment, the interface unit 50 advantageously receives a time code. In one embodiment, an IRIG-B direct current (DC) time code is input to the output interface 58 from a time code generator 70. The time code is typically used to tag the beginning of the PCM frames that are output by the output interface 58. The output interface 58 also provides the time code to the input interface 56 to permit time stamping occurrence of a fibre channel start-of-frame (SOF). The input interface 56 may attach two words of time ahead of every fibre channel frame captured by the input interface 56. The SOF time has a programmable resolution as desired. In one embodiment, the programmable resolution may be either 250 nanoseconds or 1 microsecond, as desired. Programming the resolution is accomplished via the processor 60.

Referring again to FIGS. 1 and 2, details are provided regarding construction of the interface unit 50. In one embodiment, the interface unit 50 may receive up to 4 fiber optic fibre channel inputs, however, in alternate embodiments, a greater number may be used. The input interface 56 may include two channels on one board. Therefore, in one embodiment, two input interfaces 56 are provided for receiving up to four input channels. Details of each input channel 72 are set forth below.

Figure 2:
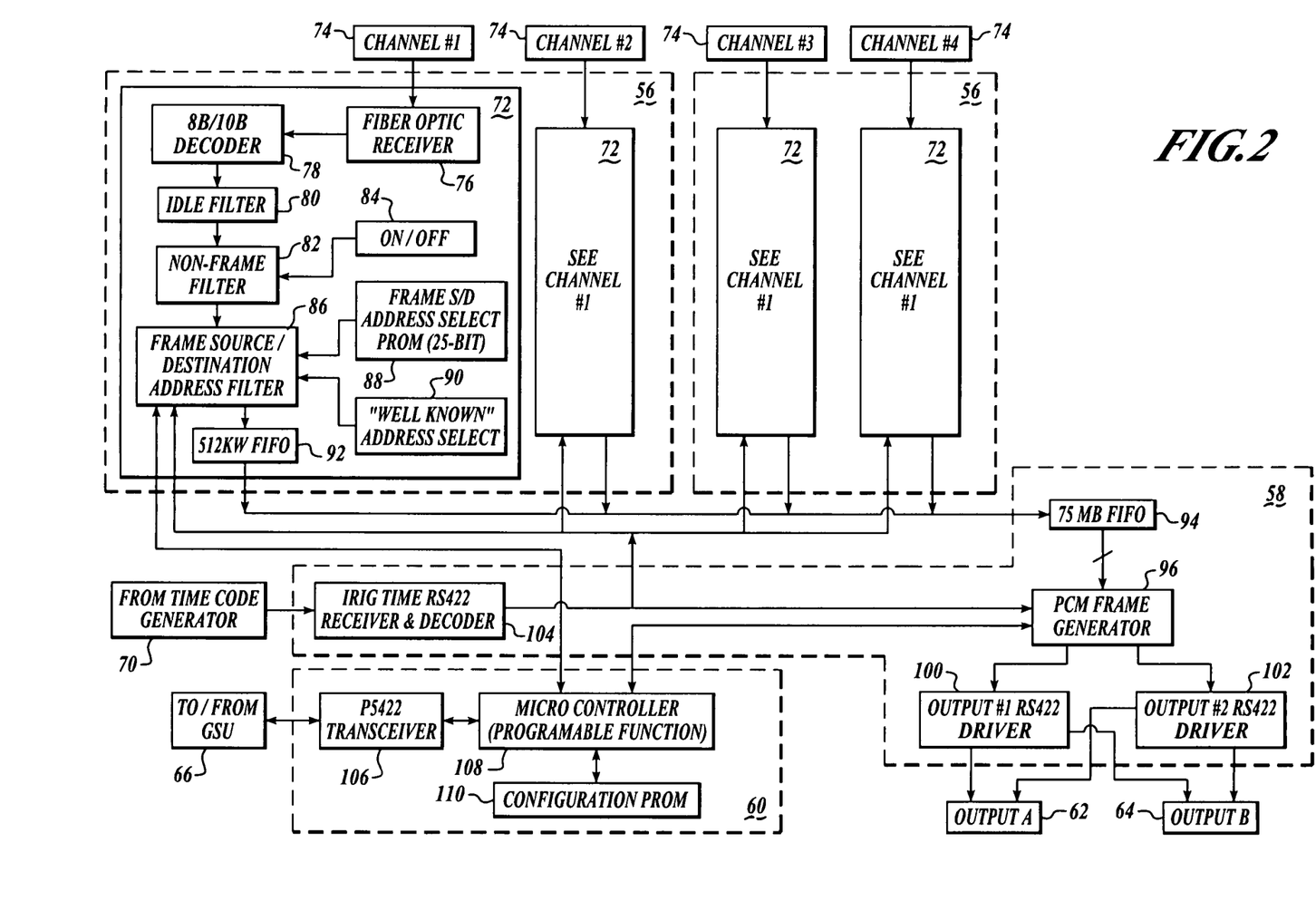
FIG. 2 is a block diagram of a portion of the fibre channel interface unit of FIG. 1.

A termination 74 couples the input interface 56 to the node 52. A fiber optic receiver 76 is coupled to the termination 74 to receive input signals from the node 52. In one embodiment, the receiver 76 may be a stand-alone receiver. However, in another embodiment, the receiver 76 is part of a transceiver. Any acceptable receiver or transceiver may be used for the receiver 76 for receiving data words having characteristics as set forth above. Given by way of non-limiting example, an acceptable receiver includes a Finisar FTRJ-8519-1 receiver. A decoder 78 is coupled to the receiver 76. The decoder 78 performs standard 8B/10B decoding.

An idle filter 80 is coupled to the decoder 78. The idle filter 80 filters, that is removes, all idle primitive signals. Idle primitive signals are placed on busses even when no information content is included in the signals in order to keep components in receivers synchronized or locked together.

A non-frame filter 82 filters primitive signals and sequences (other than idles). The primitive signals and sequences are not part of a frame. The primitive signals and sequences are filtered by the non-frame filter 82 on an all-or-none basis as enabled by a block 84.

Advantageously, an address filter 86 may filter fibre channel frames based on 24-bits of source identification address or destination identification address using a frame select programmable read-only memory (PROM) 88. If desired, "well-known" source or destination addresses per the fibre channel specification may be provided to the address filter 86 by a well-known address select 90.

A first-in-first-out (FIFO) buffer 92 buffers bursts of fibre channel traffic. The buffer 92 suitably has a minimum size of 256 K words. In one embodiment, the buffer 92 has a size of 512 K words. If a FIFO overflow occurs, the buffer 92 does not accept any new fibre channel data (that is, new fibre channel data is ignored) until the buffer 92 has been emptied and an error word has been inserted into the output stream from the buffer 92.

In one exemplary embodiment, the output interface 58 formats the fibre channel words received from the buffer 92 into PCM frame format and provides the PCM frame output signals to the recorder 62 and the fibre channel playback unit 64. A FIFO buffer 94 is coupled to receive the fibre channel output stream from the buffer 92. The buffer 94 provides its output in parallel to a PCM frame generator 96. The PCM frame generator 96 may be programmed to output a single output stream, such as to the recorder 62. Alternately, the PCM frame generator 96 may be programmed to output a dual output stream, such as to the recorder 62 and the fibre channel playback unit 64. Each output may be a fixed word width of 36-bits and a fixed frame length of 256 words. The PCM output streams may be in serial data format. The serial PCM data streams advantageously may be programmable either to contain fill words to provide a continuous clock or to contain a fill word that is inserted every 10 milliseconds for providing a more efficient PCM data frame. However, an output is still provided when no fibre channel data is available. In addition, merged words from different Fibre Channel inputs may be interleaved.

Output drivers 100 and 102 receive PCM formatted output from the PCM frame generator 96. The drivers 100 and 102 are coupled to provide the output data stream from the output interface 58 to the recorder 62 and/or the fibre channel playback unit 64, as desired. The drivers 100 and 102 suitably are RS-422 compatible drivers that are compatible with 26C32 receivers. In one exemplary embodiment, the drivers 100 and 102 provide NRZ-L or RNRZ-L serial data with a 20 Megabps maximum PCM data rate and a dynamic frame rate.

An IRIG time RS-422 receiver and decoder 104 receives IRIG time code from the time code generator 70. The receiver and decoder 104 may provide time code signals to the PCM frame generator 96 and to the address filter 86.

The processor 60 may include an RS-422 transceiver 106 that is coupled to the user interface 66. Information regarding desired programmable features may be communicated from the user interface 66 to the transceiver 106. In one exemplary embodiment, communications are full duplex (that is one pair for each direction) at a baud rate of 19.2 K. Programming information is provided from the transceiver 106 to a controller 108, such as a micro-controller. Acceptable controllers given by way of non-limiting example include an Intel TA80C186XL-20 controller or the like. Configuration data for the interface unit 50 is stored in a configuration PROM 110. The controller 108 advantageously retrieves configuration data from the configuration PROM 110.

Figure 3:
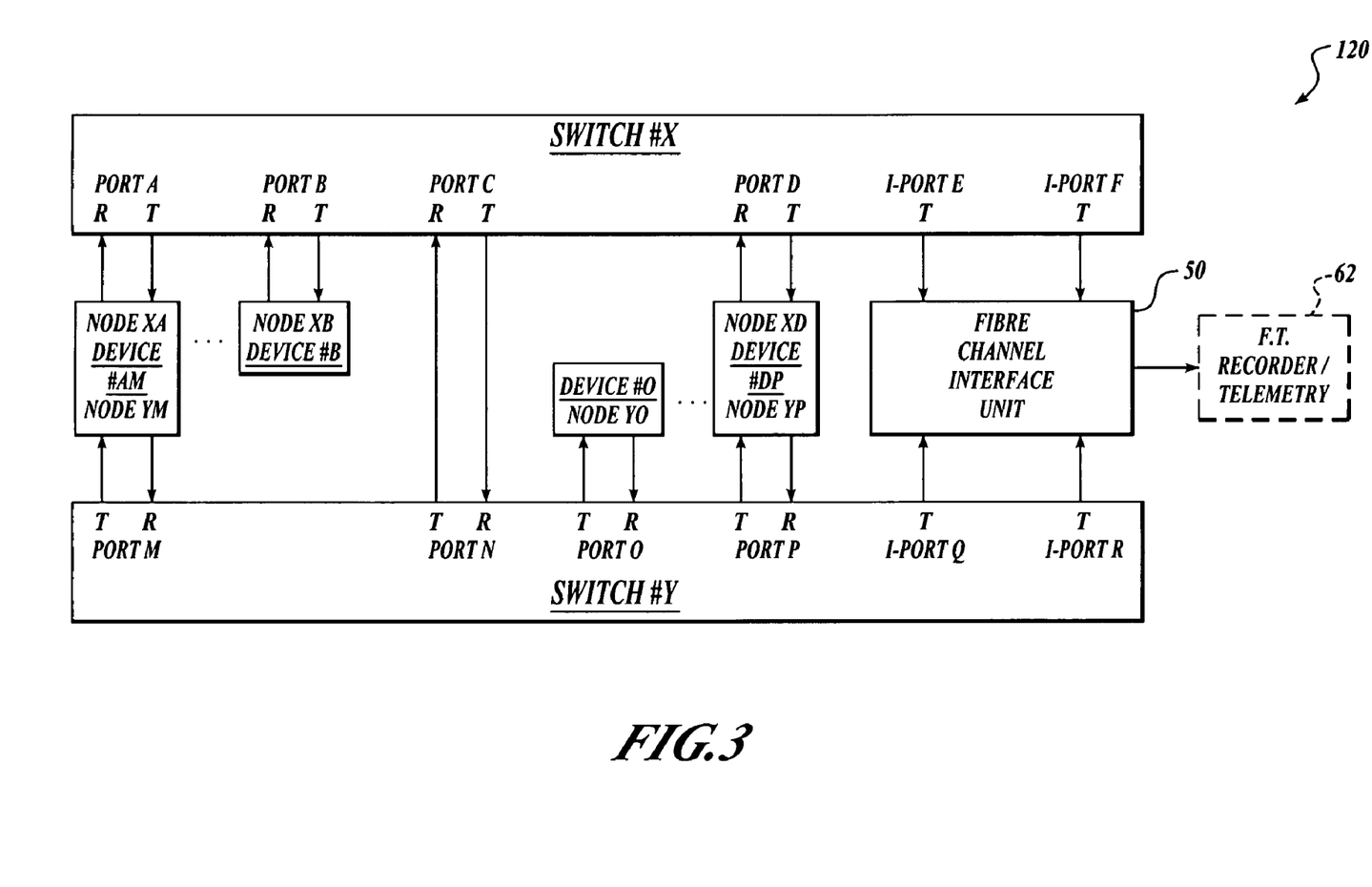
FIG. 3 is a block diagram of a fibre channel network that includes a fibre channel interface unit in accordance with an embodiment of the present invention.

Referring now to FIG. 3, a fibre channel network 120 in accordance with an embodiment of the invention includes the interface unit 50 for monitoring data and the recorder 62. The network 120 includes a switch X with ports A, B, C and D. A switch Y includes ports M, N, O, and P. Each of the ports includes a transmit port T and a receive port R. Devices AM, B, O and DP are coupled to the switches X and Y. The device AM includes nodes XA and YM. The device B includes a node XB. The device O includes a node YO. The device DP includes nodes XD and YP.

The switch X includes an instrumentation port (I-port) E and an I-port F. The instrumentation ports are transmit-only ports that have special instrumentation characteristics. Likewise, the switch Y has an I-port Q and an I-port R. The interface unit 50 is coupled to the I-ports E, F, Q and R. In the embodiment shown in FIG. 3, the interface unit 50 does not converse with the I-ports E, F, Q, and R. However, the interface unit 50 is able to receive the full bandwidth of the link. Advantageously, the I-ports E, F, Q, and R are programmable to be able to listen to any transmission by or reception at a port on its respective switch X, or Y. This programmability advantageously enables reconfiguration during operation because the switch X or Y decides which ports are monitored. Advantageously, this feature is not difficult to add to the switch X or Y because normal ports are used and because the ports only are disabled from shutting down due to lack of incoming communication. In addition, internal routing tables of the switch X or Y are modified to replicate transfer of the switches port-to-port communications to multiple ports (that is, original data port and instrumentation port).

Figure 4:
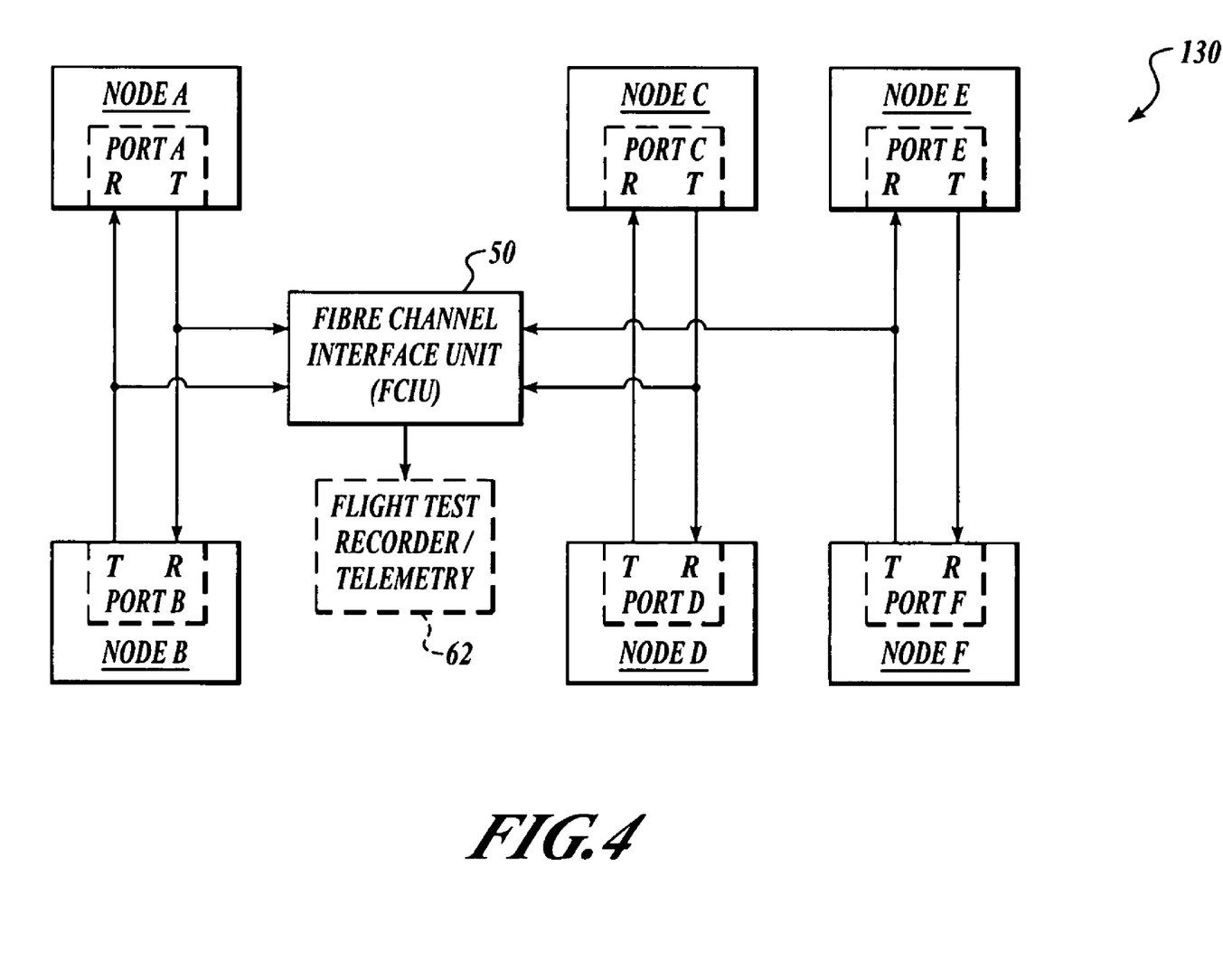
FIG. 4 is a block diagram of a fibre channel network in accordance with an alternate embodiment of the present invention.

Referring now to FIG. 4, the interface unit 50 and the recorder 62 advantageously may be used to monitor data in an embodiment of a network 130 that does not include any fibre channel switches. It will be appreciated that insertion of the interface unit 50 may entail breaking links between nodes. A passive coupler may be used to couple the interface unit 50 to the nodes. Alternately, an active coupler may be used without affecting signal margin in the network 130. Once the interface unit 50 is inserted into the network 130, it will be appreciated that configuration is then set. Unlike the network 120 (FIG. 3), reconfiguring the monitoring point is not provided.

Figure 5:
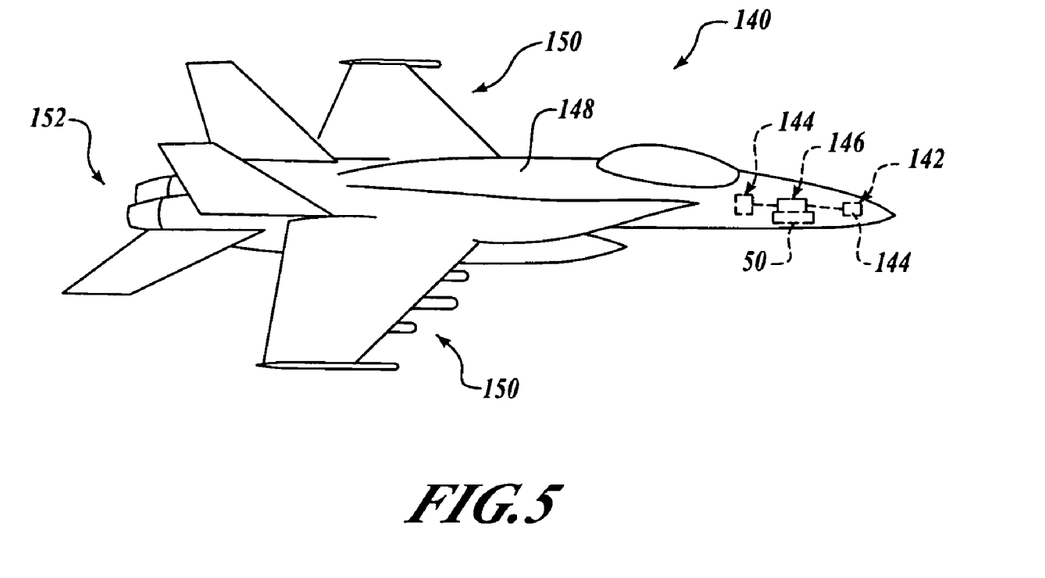
FIG. 5 illustrates an aircraft including a fibre channel interface unit in accordance with another embodiment of the present invention.

Referring now to FIG. 5, an aircraft 140 includes avionics, such as a radar system 142 that includes components 144 (shown in phantom) that are interconnected via a fibre channel network 146 (shown in phantom). The aircraft 140 includes a fuselage 148, lift generating surfaces 150 such as a pair of wings, and at least one engine 152. The interface unit 50 advantageously is non-intrusively inserted into the fibre channel network 146 for monitoring data communications within the fibre channel network 146 as described above.

In one embodiment, the aircraft 140 may be a fighter aircraft, such as, for example, an F/A-18E Super Hornet manufactured by The Boeing Company of Chicago, Ill. However, it will be appreciated that the fibre channel network 146 may be included in any other suitable aircraft. For example, in alternate embodiments, the aircraft may be a fighter aircraft, a rotary aircraft, a bomber aircraft, or any other suitable type of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

Figure 6:
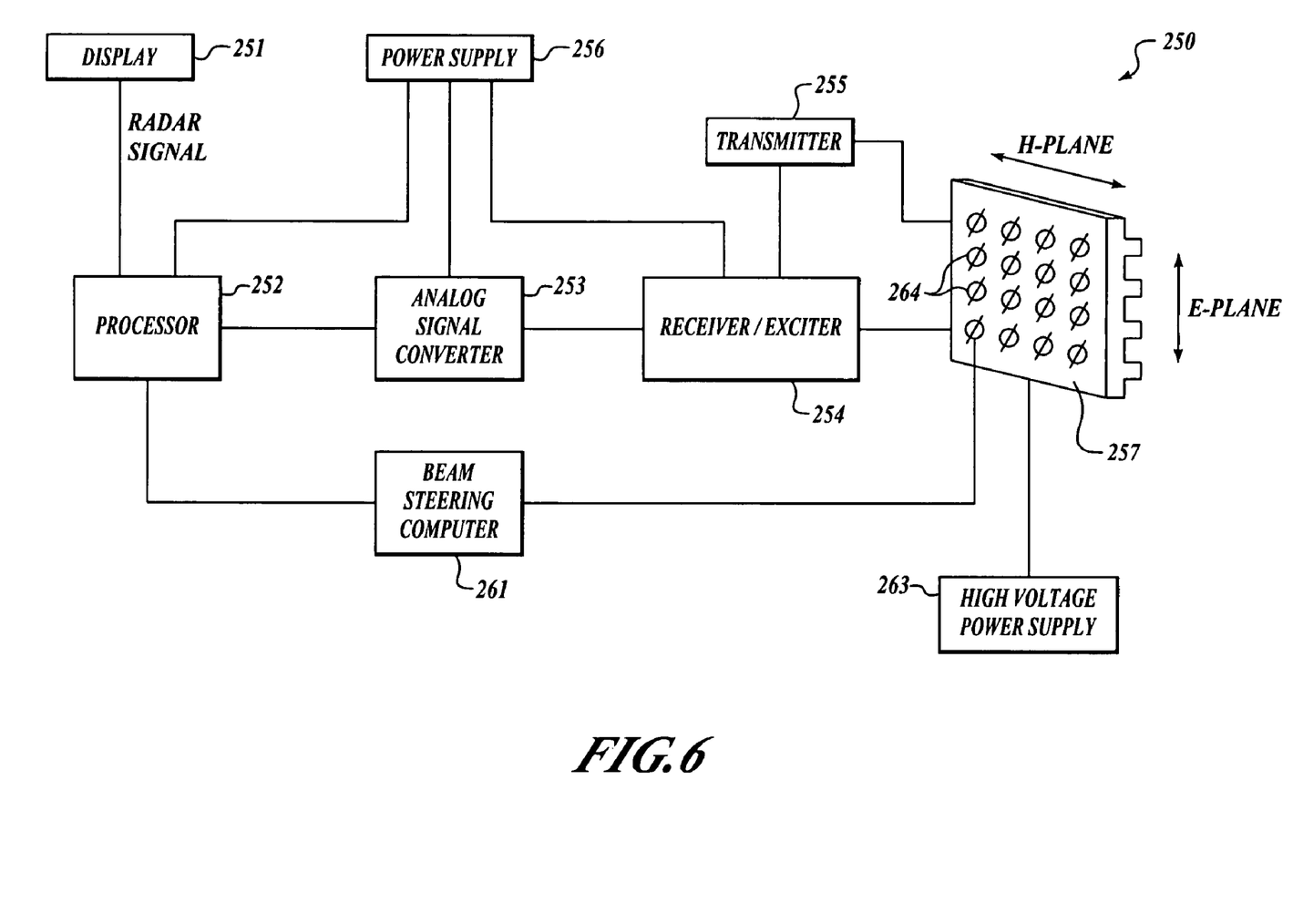
FIG. 6 is a schematic view of a radar system in accordance with an alternate embodiment of the invention.

It will be appreciated that the avionics system 142 of the aircraft 140 may be any type of avionics system. As previously noted, in some embodiments, the avionics system 142 may suitably be a radar system. For example, FIG. 6 is a schematic view of a radar system 250 in accordance with an alternate embodiment of the invention. The radar system 250 comprises a radar data processor 252, a power supply 256, an analog signal converter 253, a transmitter 255, a receiver/exciter 254 and an antenna array 257. In operation, the radar system 250 uses a high voltage power supply 263 to electronically steer the antenna array 257 in the E-Plane, (perpendicular to the direction of the stubs). A beam steering computer 261 is used to set the phase-shifters 264 to steer the beam in the H-Plane to a desired pointing angle.

The radar system 250 may be a conventional, mechanically-scanned radar system, such as a conventional APG-65 radar system manufactured by the Hughes Aircraft Co. of Los Angeles, Calif. Alternately, the radar system 250 may be an electronically-scanned radar system, including those electronically-scanned radar systems generally disclosed, for example, in U.S. Pat. No. 5,469,165 issued to Milroy, and in U.S. Pat. No. 5,038,147 issued to Cerro et al., which patents are incorporated herein by reference. In one particular embodiment, the radar system 250 is an APG-79 Active Electronically Scanned Array (AESA) radar system manufactured by the Raytheon Company of Waltham, Mass.

Embodiments of methods of encoding and merging multiple data streams within a fibre channel network in accordance with the invention will now be described. Referring again to FIG. 2, in one exemplary embodiment of the invention, there is provided a method of combining multiple data streams of a plurality of avionics units networked with a fibre channel network having nodes, at least one node associated with the interface unit 50 for transmitting at least some of the multiple data streams.

Figure 7:
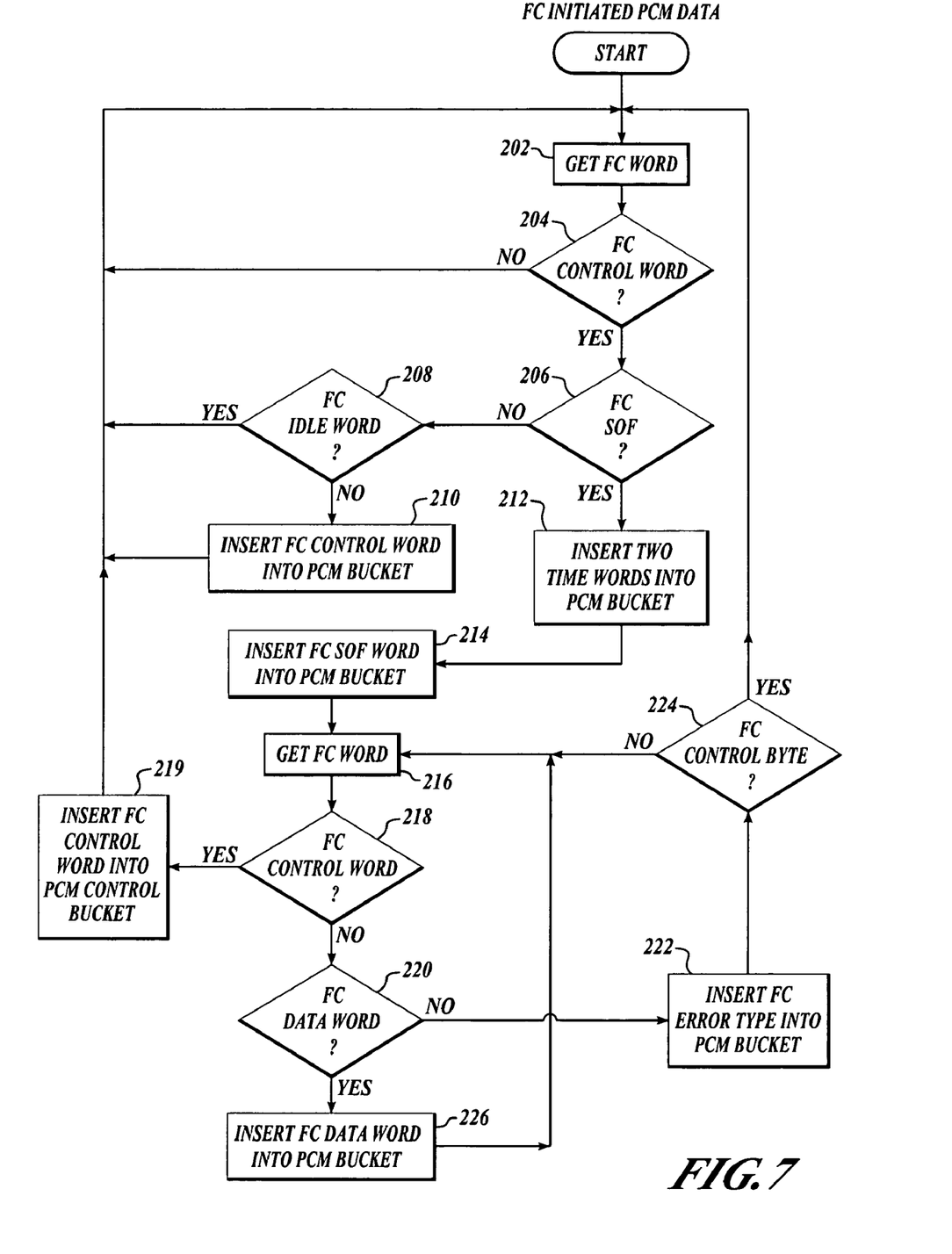
FIG. 7 is a flow chart of a method of creating packets in accordance with an embodiment of the invention.
Figure 8:
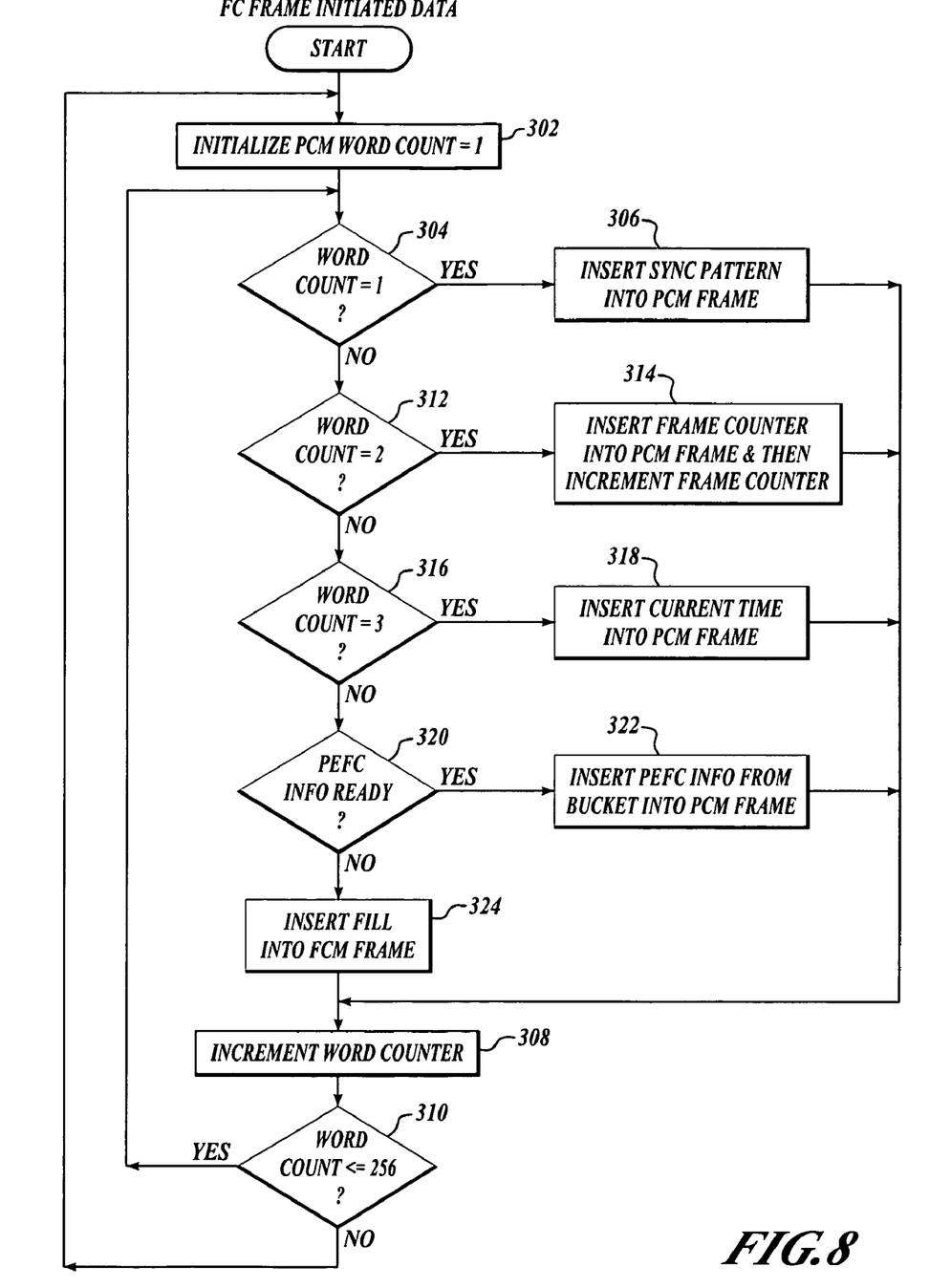
FIG. 8 is a flow chart of a method of adding PCM identification information in accordance with another embodiment of the invention.

In one embodiment, the input interface 56 operates as illustrated in FIG. 7 to create packets of PCM Encoded Fibre Channel (PEFC) information which are provided to buffer 92. In a further embodiment, the output interface 58 may operate as illustrated in FIG. 8 to format the PEFC words received from each of the created packets of the buffers 92 into the PEFC output format by adding frame identification information to each of the created packets. In this embodiment, the output interface 58 also operates as illustrated in FIG. 8 to provide the PEFC formatted output signals to a recorder 62 and a telemetry system 64.

As shown in FIG. 2, the FIFO buffer 94 is coupled to receive the PEFC output stream from the buffer 92. The buffer 94 provides its output in parallel to the PCM frame generator 96. The PCM frame generator 96 may be programmed to output a single output stream, such as to the recorder 62. Alternately, the PCM frame generator 96 may be programmed to output a dual output stream, such as to two inputs of the recorder 62. Each output may be a fixed word width of 36-bits and a fixed frame length of 256 words. The PCM output streams may be in serial data format. The serial PCM data streams advantageously may be programmable either to contain fill words to provide a continuous clock or to contain a fill word that is inserted every 10 milliseconds for providing a more efficient PCM data frame. However, an output is still provided when no fibre channel is available. In addition, merged words from different fibre channel inputs may be interleaved.

The output drivers 100 and 102 receive PCM formatted output from the PCM frame generator 96. The drivers 100 and 102 are coupled to provide the output data stream from the output interface 58 to the recorder 62 and/or the telemetry system 64, as desired. The drivers 100 and 102 suitably are RS-422 compatible drivers that are compatible with 26C32 receivers. In one exemplary embodiment, the drivers 100 and 102 provide NRZ-L or RNRZ-L serial data with a 20 Megabps maximum PCM data rate and a dynamic frame rate.

The IRIG time RS-422 receiver and decoder 104 receives IRIG time code from the time code generator 70. The receiver and decoder 104 provides time code signals to the PCM frame generator 96 and to the address filter 86.

Internal Functions—Fibre Channel Interface and Data Format

In one exemplary embodiment, the FCIU 50 accepts a standard FC protocol stream as defined by ANSI X3.230-1994 Fibre Channel—Physical & Signaling Interface (FC-PH). The FCIU uses the standard 8B/10B decoding. Fibre Channel Transmission Words (FCTW) are one of two forms: "K28.5 Dxx.y Dxx.y Dxx.y" or "Dxx.y Dxx.y Dxx.y Dxx.y". Each FC Input (FCI) interface 56 formats the FCTWs into 36-bit PCM words, an example of which is illustrated in the Appendix.

Fibre Channel Data Filtering

In one exemplary embodiment, each of the four channels is individually enabled and filtered. All "Idle Primitive Signals" are filtered (i.e. removed). Other than "Idles", "Primitive Signals and Sequences" (which are not part of a frame) are filtered on an "all" or "none" basis. The FCIU 50 is capable of filtering FC frames based on 24-bits of the source or destination ID using frame select PROMs. The FCI interface 56 terminates a captured frame when it detects any "K" character. For a good FC frame, it will be the End-Of-Frame FCTW.

Time Tagging

In one exemplary embodiment, the FCIU 50 inserts two current time words ahead of each collected FC frame. The inserted words correspond to the detection by the FCIU of the FC Start-Of-Frame (SOF) primitive (FIG. 7). When using a switch, this time may be significantly different than the actual FC frame time due to buffering inside the switch between ports. For example, if no FC traffic is detected for 10 mS, then these two time words will be inserted without FC frame data. The FCIU inserts a frame counter and the MS time word immediately following the PCM frame sync in the output PCM streams. If two outputs are enabled ("Dual"), then the PCM frame counter and time of both streams are the same in order that data processing may realign them back together. The FCIU synchronizes its internal time to an external time source. If external time is not available, the FCIU time is free-run. An external time synchronization lock is reported in status. See the Appendix and Tables 1 and 2 for an exemplary definition of the time fields for time tagging. The time fields used by the FCIU may be similar to those defined in Chapter 4.7 of the IRIG-106-00 standard (IRIG is the Interrange Instrumentation Group, which is part of the Range Commanders Council). Note that IRIG-106 "Binary Weighted Only" time is not supported.

Output PCM Frame Structure

In one exemplary embodiment, the FCIU has two output options, "Single" mode (see the Appendix, Table 4, right column) or "Dual" mode (see the Appendix, Table 3, left and center columns), however, in alternate embodiments, a greater number of output options may be used. Each output may have a fixed word width of 36 bits and a fixed frame length of 256 words. The serial PCM stream(s) is programmable either to contain fill words to provide a continuous clock or to contain a fill word inserted every 10 mS for providing a more efficient PCM data frame, but still provide an output when no FC data is available. The merged words from different FC inputs may be interleaved. For "Dual" operation, the FCIU ping-pongs the FC data between both outputs with output #1 being the first output of the sequence. The frame sync word is unique for each output.

PCM Word Definitions

In one exemplary embodiment, the MS bit ($D_{35}$) of the PCM word indicates the "type" of PCM word. Type I is for data extracted from the FC bus. Type II is for data generated by the FCIU.

FC Initiated PCM Data

Referring now to FIG. 7, a flow chart is provided illustrating one exemplary embodiment according to the invention by which the input interface 56 operates to create packets of PEFC information which are provided to buffer 92. The process starts by getting a fibre channel word at 202 and determining at 204 whether or not the identified word is a control word. If the word being evaluated is not a control word, the process continues to 202 to get subsequent words and to 204 to evaluate whether each word is a control word. When it is determined at 204 that a control word has been identified, the process proceeds to 206 to determine whether or not the identified control word indicates the start of a frame (SOF). If not, the process proceeds to 208 to determine whether the identified control word is an idle word. If it is, the process returns to 202 to look for the next fibre channel word. If it is not an idle word and not a start of frame word, the process proceeds to 210 to insert the fibre channel control word into a PCM bucket. (e.g. the word is stored in buffers 92 and 94). As an example of this aspect illustrated in one exemplary form, see the Appendix at Section A.1, particularly Section A.1.a (when the word type=1), Section A.1.b and Section A.1.c.

If it is determined at 206 that the word is the start of a frame (SOF) the process proceeds to 212 to insert two time words into the PCM bucket. As an example of this aspect illustrated in one exemplary form, see the Appendix at Section A.2.1, particularly Section A.2.1.a, Section A.2.1.b (when the word type=00), Section A.2.1.b (when the word type=01), and Section A.2.1.c.

From 212, the process proceeds to 214 to insert the FC start of frame word into the PCM bucket. As an example of this aspect illustrated in one exemplary form, see the Appendix at Section A.1, particularly Section A.1.a (when the word type=1), Section A.1.b and Section A.1.c.

The process then continues at 216 looking for the next fibre channel word. If the next fibre channel word is a control word as determined at 218, the control word is inserted in the PCM control bucket at 219, and the process returns to 202 and then 204 to process the determined control word as noted above. If at 218 the next word is not a control word and is not a data word as determined at 220, the process proceeds to 222 to insert an FC error type into the PCM bucket. As an example of this aspect illustrated in one exemplary form, see the Appendix at Section A.2.1, particularly Section A.2.1.a, Section A.2.1.b (when the word type=11), and Section A.2.1.c.

The process then proceeds to 224 to determine whether the word contains a fibre channel control byte. If it does not, the process then loops back and gets the next word at 216. If at 224 the word is determined to contain a control byte, the process returns to 202 and then 204 to process the control word as noted above.

If at 220 it is determined that the next word is an FC data word, the process proceeds to step 226 to insert an FC data word into the PCM bucket. As an example of this aspect illustrated in one exemplary form, see the Appendix at Section A.1, particularly Section A.1.a (when the word type=0), Section A.1.b and Section A.1.c.

With continued reference to FIG. 7, it should also be noted that it is possible to append the FC input channel number to all words that are inserted into the PCM bucket. For example, encoding may include adding identification information of each of the fibre channel streams.

For simplicity, not all possibilities have been shown in the flow chart of FIG. 7. For example, a fibre channel hardware input overflow could occur at any time which would force an overflow indicator into the PCM bucket.

PCM Frame Initiated Data

Referring to FIG. 8, a flow chart is illustrated of one exemplary embodiment of a process according to the invention by which the output interface 58 operates to format the fibre channel words received from the buffer 92 into PEFC format by adding PCM frame identification information to provide the PEFC formatted packets to the recorder 62 and the telemetry system 64. The process starts at 302 by initializing the PCM word count to be equal to 1. At 304, the word count is evaluated and if the count equals 1, the process proceeds to 306 to insert a synchronization pattern into the PCM frame. As an example of this aspect illustrated in one exemplary form, see the Appendix at Section A.2.2.a (when the word type=111).

From 306, the process proceeds to 308 to increment the word counter. If the incremented word count is greater than 256 as determined at 310, the process starts over and returns to 302 to initialize the PCM word count to be equal to 1. If at 310 it is determined that the word count is less than or equal to 256, the process proceeds to 304 to further process the next word.

If it is determined at 304 that the word count is not equal to 1 (e.g. if the word counter has been incremented to 2 or more at 308), the process proceeds to 312 to determine whether the word count equals 2. If the word count equals 2, the process proceeds to 314 to insert a frame counter into the PCM frame and increment the frame count. As an example of this aspect illustrated in one exemplary form, see the Appendix at Section A.2.2.a (when the word type=000). The process then proceeds to 308 as noted above to increment the word counter.

If at 312 the word count is not 2, the process proceeds to 316. If at 316 it is determined that the word count equals 3, the process proceeds to 318 to insert the current time into the PCM frame. As an example of this aspect illustrated in one exemplary form, see the Appendix at Section A.2.2.a (when the word type=001). The process then proceeds to 308 as noted above to increment the word counter.

If the word count is not 1 or 2 or 3 as determined at 304, 312 and 316, respectively, the process proceeds to 320 to determine if the PEFC information is ready. If so, then the process proceeds to 322 to insert the PEFC information from the bucket into the PCM frame. The process then proceeds again to 308 as noted above to increment the word counter. If it is determined at 320 that the PEFC information is not ready (e.g. no PEFC information is available), the process proceeds to 324 to insert a fill word (e.g. "D2AAAAAA") into the PCM frame. As an example of this aspect illustrated in one exemplary form, see the Appendix at Section A.2.2.a (when the word type=010).

It should be noted that all inserted PCM initiated words are type II, sub-type B. It is contemplated that the flow charts may vary according to the type of mode. For example, the flow may be slightly different when using track splitting modes. For simplicity, not all possibilities have been shown in the flow charts. For example, a PCM hardware overflow could occur at any time which would override the insertion of the PEFC information at 322.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

APPENDIX

Example of Word Types

Options for Output PCM Frame Structure:

TABLE 3

| Dual Output | | | |
|---|---|---|---|
| Output #1 | | Output #2 | |
| 1 | Frame Sync 1 | 1 | Frame Sync 2 |
| 2 | Frame Count i | 2 | Frame Count i |
| 3 | Time Word $1_i$ | 3 | Time Word $1_i$ |
| 4 | Merged Wd n | 4 | Merged Wd n + 1 |
| 5 | Merged Wd n + 2 | 5 | Merged Wd n + 3 |
| 6 | Merged Wd n + 4 | 6 | Merged Wd n + 5 |
| . | . | . | . |
| . | . | . | . |
| 256 | Merged Wd m − 2 | 256 | Merged Wd m − 1 |
| 1 | Frame Sync 1 | 1 | Frame Sync 2 |
| 2 | Frame Count i + 1 | 2 | Frame Count i + 1 |
| 3 | Time Word $1_{i+1}$ | 3 | Time Word $1_{i+1}$ |
| 4 | Merged Wd m | 4 | Merged Wd m + 1 |
| 5 | Merged Wd m + 2 | 5 | Merged Wd m + 3 |
| 6 | Merged Wd m + 4 | 6 | Merged Wd m + 5 |
| . | . | . | . |
| . | . | . | . |

TABLE 4

Single Output

| | Output #1 |
|---|---|
| 1 | Frame Sync 1 |
| 2 | Frame Count I |
| 3 | Time Word $1_i$ |
| 4 | Merged Wd n |
| 5 | Merged Wd n + 1 |
| 6 | Merged Wd n + 2 |
| . | . |
| . | . |
| . | . |
| 256 | Merged Wd m − 1 |
| 1 | Frame Sync 1 |
| 2 | Frame Count i + 1 |
| 3 | Time Word $1_{i+1}$ |
| 4 | Merged Wd m |
| 5 | Merged Wd m + 1 |
| 6 | Merged Wd m + 2 |
| . | . |
| . | . |
| . | . |

TIME FIELDS FOR TIME TAGGING—The bit definitions for the MS (most significant) time field and the LS (least significant) time field are shown in Tables 1 and 2, respectively.

TABLE 1

MS Time Field

| $D_{23}$ | $D_{22}$ | $D_{21}$ | $D_{20}$ | $D_{19}$ | $D_{18}$ | $D_{17}$ | $D_{16}$ | $D_{15}$ | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
|---|---|---|---|---|---|---|---|---|---|---|---|---|---|---|---|---|---|---|---|---|---|---|---|
| 1 Day | | 10 Hour | | | 1 Hour | | | 10 Minute<br>BCD Weighted | | | | 1 Minute | | | | 0 | | 10 Second | | | 1 Second | | |

TABLE 2

LS Time Field

| $D_{23}$ | $D_{22}$ | $D_{21}$ | $D_{20}$ | $D_{19}$ | $D_{18}$ | $D_{17}$ | $D_{16}$ | $D_{15}$ | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
|---|---|---|---|---|---|---|---|---|---|---|---|---|---|---|---|---|---|---|---|---|---|---|---|
| 0.1 Second | | | | 0.01 Second<br>BCD Weighted | | | | | | | 0.25 or 1.0 Microsecond (See FCI Filter Mode)<br>Binary Weighted | | | | | | | | | | | | |

SECTION A.1—PCM word type I is illustrated in the following Table 5:

| (FCTW − $D_{35}$ = 0) (MSN = 0-7) | | | | |
|---|---|---|---|---|
| $D_{35}$ | $D_{34}$ | $D_{33}$ | $D_{32}$ | $D_{31}$-$D_0$ |
| 0 | a | b | | c |

SECTION A.1.a—Fibre Channel transmission word type is illustrated in the following Table 6:

| $D_{34}$ | Description | (MSN) |
|---|---|---|
| 0 | Data Word - Dxx.y Dxx.y Dxx.y Dxx.y | (0-3) |
| 1 | Control Word - Kxx.y Dxx.y Dxx.y Dxx.y | (4-7) |

SECTION A.1.b—Channel number ($D_{35}$–$D_{34}$='0$X_B$') is illustrated in the following Table 7:

| $D_{33}$ | $D_{32}$ | Description |
|---|---|---|
| 0 | 0 | Data from Channel 1 input |
| 0 | 1 | Data from Channel 2 input |
| 1 | 0 | Data from Channel 3 input |
| 1 | 1 | Data from Channel 4 input |

SECTION A.1.c—8B/10B decoded FCTWs.

SECTION A.2—PCM word type II (FC frame and PCM frame words—$D_{35}$=1)(MSN=8–F) is illustrated in the following Table 8:

| $D_{35}$ | $D_{34}$ | $D_{33}$-$D_0$ |
|---|---|---|
| 1 | a | b |

SECTION A.2.a—PCM word type II sub-type is illustrated in the following Table 9:

| $D_{34}$ | Description |
|---|---|
| 0 | Sub-Type A - Information Associated with FCI Frame |
| 1 | Sub-Type B - Information Associated with PCM Frame |

SECTION A.2.b—Sub-type information.

SECTION A.2.1—The following Table 10 illustrates Sub-Type A (FC Frame–$D_{34}$=0)

| $D_{34}$ | $D_{33}$ | $D_{32}$ | $D_{31}$ | $D_{30}$ | $D_{29}$-$D_0$ |
|---|---|---|---|---|---|
| 0 | a | | b | | c |

SECTION A.2.1.a—Channel Number ($D_{35}$–$D_{34}$='$10_B$') is illustrated in the following Table 11:

| $D_{33}$ | $D_{32}$ | Description | (MSN) |
|---|---|---|---|
| 0 | 0 | Data associated with Channel 1 input | (8) |
| 0 | 1 | Data associated with Channel 2 input | (9) |
| 1 | 0 | Data associated with Channel 3 input | (A) |
| 1 | 1 | Data associated with Channel 4 input | (B) |

SECTION A.2.1.b—FCIU Data Type is illustrated in the following Table 12:

| $D_{31}$ | $D_{30}$ | Description | (NSN) |
|---|---|---|---|
| 0 | 0 | Time Word 1 | (0-3) |
| 0 | 1 | Time Word 2 | (4-7) |
| 1 | 0 | Overflow/Underflow/Reserved | (8-B) |
| 1 | 1 | Error Word | (C-F) |

SECTION A.2.1.c—Data Field—Definitions depend on Data Type as illustrated in the following Tables 13-19:

TABLE 13

Time Word 1 - ($D_{31}$-$D_{30}$ = '$00_B$')

| $D_{31}$ | $D_{30}$ | $D_{29}$ | $D_{28}$ | $D_{27}$ | $D_{26}$ | $D_{25}$ | $D_{24}$ | $D_{23}$-$D_0$ |
|---|---|---|---|---|---|---|---|---|
| 0 | 0 | \multicolumn{6}{c}{Status A} | MS Time |
|  |  | $S_{A5}$ | $S_{A4}$ | $S_{A3}$ | $S_{A2}$ | $S_{A1}$ | $S_{A0}$ |  |

TABLE 14

Status A

| Status Bits | Description | |
|---|---|---|
| $S_{A5}$ ($D_{29}$) | Non K28.5 K Character | (001) |
| $S_{A4}$ ($D_{28}$) | Not Used by FC Decoder | (010) |
| $S_{A3}$ ($D_{27}$) | Codeword Violation | (100) |
| $S_{A2}$ ($D_{26}$) | Loss of CRU Bit Lock | (101) |
| $S_{A1}$ ($D_{25}$) | Disparity Error | (110) |
| $S_{A0}$ ($D_{24}$) | Not Used by FC Decoder | (111) |

TABLE 15

Time Word 2 - ($D_{31}$-$D_{30}$ = '$01_B$')

| $D_{31}$ | $D_{30}$ | $D_{29}$ | $D_{28}$ | $D_{27}$ | $D_{26}$ | $D_{25}$ | $D_{24}$ | $D_{23}$-$D_0$ |
|---|---|---|---|---|---|---|---|---|
| 0 | 1 | \multicolumn{6}{c}{Status B} | LS Time |
|  |  | $S_{B5}$ | $S_{B4}$ | $S_{B3}$ | $S_{B2}$ | $S_{B1}$ | $S_{B0}$ |  |

TABLE 16

Status B

| Status Bits | Description |
|---|---|
| $S_{B5}$ ($D_{29}$) | Word Boundary Error |
| $S_{B4}$ ($D_{28}$) | Fiber Signal Detect Error |
| $S_{B3}$ ($D_{27}$) | Undefined |
| $S_{B2}$ ($D_{26}$) | Undefined |
| $S_{B1}$ ($D_{25}$) | Undefined |
| $S_{B0}$ ($D_{24}$) | 10 mS Time Resolution: 0 = 250 nS, 1 = 1 μS |

TABLE 17

Overflow/Underflow - ($D_{31}$-$D_{30}$ = '$10_B$')

| $D_{31}$ | $D_{30}$ | $D_{29}$ | $D_{28}$ | $D_{27}$-$D_0$ | Description | |
|---|---|---|---|---|---|---|
| 1 | 0 | 0 | 0 | $5555555_H$ | Overflow | $H85555555_H$ |
| 1 | 0 | 0 | 1 | $AAAAAAA_H$ | Under-Flow | $H9AAAAAAA_H$ |
| 1 | 0 | 1 | 0 | (undefined) | Reserved | |
| 1 | 0 | 1 | 1 | (undefined) | Reserved | |

(H = '10 $nn_B$' where nn = Chan. #)

TABLE 18

Error Word - ($D_{31}$-$D_{30}$ = '$11_B$')

| $D_{31}$ | $D_{30}$ | $D_{29}$ | $D_{28}$ | $D_{27}$-$D_{16}$ | $D_{15}$-$D_{12}$ | $D_{11}$-$D_8$ | $D_7$-$D_4$ | $D_3$-$D_0$ |
|---|---|---|---|---|---|---|---|---|
| 1 | 1 | 0 | 0 | 000 | MSB Info | NMSB Info | NLSB Info | LSB Info |

TABLE 19

"Info" = '$0xxx_B$' where 'xxx' is defined as:

| Info Bits | Description |
|---|---|
| 000 | Normal Character |
| 001 | Non K28.5 K Character |
| 010 | Not Used by FC Decoder |
| 011 | K28.5 Character |
| 100 | Codeword Violation |
| 101 | Loss of CRU Bit Lock |
| 110 | Disparity Error |
| 111 | Not Used by FC Decoder |

SECTION A.2.2—The following Table 20 illustrates Sub-Type B (PCM Frame–$D_{34}$=1) (MSN=C–F)

| $D_{34}$ | $D_{33}$ | $D_{32}$ | $D_{31}$ | $D_{30}$-$D_0$ |
|---|---|---|---|---|
| 1 | | a | | B |

SECTION A.2.2.a—Data Type ($D_{35}$–$D_{34}$='$11_B$') is illustrated in the following Table 21:

| $D_{33}$ | $D_{32}$ | $D_{31}$ | Description | (MSN) | (NSN) |
|---|---|---|---|---|---|
| 0 | 0 | 0 | Frame Count | (C) | (0-7) |
| 0 | 0 | 1 | Time Word 1 | (C) | (8-F) |
| 0 | 1 | 0 | Fill | (D) | (2) |
| 0 | 1 | 1 | Overflow | (D) | (D) |
| 1 | 0 | 0 | Undefined | (E) | (0-7) |
| 1 | 0 | 1 | Undefined | (E) | (8-F) |
| 1 | 1 | 0 | Undefined | (F) | (0-7) |
| 1 | 1 | 1 | Frame Sync | (F) | (E) |

SECTION A.2.2.b—Data Field—Definitions depend on Data Type as illustrated in the following Tables 22-30:

TABLE 22

Frame Count Word - ($D_{33}$-$D_{31}$ = '$000_B$')

| $D_{33}$ | $D_{32}$ | $D_{31}$ | $D_{30}$ | $D_{29}$ | $D_{28}$ | $D_{27}$ | $D_{26}$ | $D_{25}$ | $D_{24}$ | $D_{23}$-$D_0$ |
|---|---|---|---|---|---|---|---|---|---|---|
| 0 | 0 | 0 | \multicolumn{7}{c}{Status C} | | | | | | | | Binary Frame Counter |
| | | | $S_{C6}$ | $S_{C5}$ | $S_{C4}$ | $S_{C3}$ | $S_{C2}$ | $S_{C1}$ | $S_{C0}$ | |

TABLE 23

Status C with Binary Frame Counter = x . . . $x0_b$

| Status Bits | Description |
|---|---|
| $S_{C6}$-$S_{C0}$ ($D_{30}$-$D_{24}$) | ASCII Internal Status Information (Null terminated string.) |

TABLE 24

Status C with Binary Frame Counter = x . . . $x00000001_b$

| Status Bits | Description |
|---|---|
| $S_{C6}$ ($D_{30}$) | Undefined |
| $S_{C5}$ ($D_{29}$) | IRIG LOCK |

TABLE 24-continued

Status C with Binary Frame Counter = x . . . $x00000001_b$

| Status Bits | Description |
|---|---|
| $S_{C4}$ ($D_{28}$) | PCM Output Mode: 0 = Sngl, 1 = Dual |
| $S_{C3}$ ($D_{27}$) | FCI #4 Activity (i.e. Frames) |
| $S_{C2}$ ($D_{26}$) | FCI #3 Activity (i.e. Frames) |
| $S_{C1}$ ($D_{25}$) | FCI #2 Activity (i.e. Frames) |
| $S_{C0}$ ($D_{24}$) | FCI #1 Activity (i.e. Frames) |

TABLE 25

Time Word 1 - ($D_{33}$-$D_{31}$ = '$001_B$')

| $D_{33}$ | $D_{32}$ | $D_{31}$ | $D_{30}$ | $D_{29}$ | $D_{28}$ | $D_{27}$ | $D_{26}$ | $D_{25}$ | $D_{24}$ | $D_{23}$-$D_0$ |
|---|---|---|---|---|---|---|---|---|---|---|
| 0 | 0 | 1 | | | | Status D | | | | MS Time |
| | | | $S_{D6}$ | $S_{D5}$ | $S_{D4}$ | $S_{D3}$ | $S_{D2}$ | $S_{D1}$ | $S_{D0}$ | |

TABLE 26

STATUS D

| Status Bits | Description |
|---|---|
| $S_{D6}$ ($D_{30}$) | Days Hundreds (2) |
| $S_{D5}$ ($D_{29}$) | Days Hundreds (1) |
| $S_{D4}$ ($D_{28}$) | Days Tens (8) |
| $S_{D3}$ ($D_{27}$) | Days Tens (4) |
| $S_{D2}$ ($D_{26}$) | Days Tens (2) |
| $S_{D1}$ ($D_{25}$) | Days Tens (1) |
| $S_{D0}$ ($D_{24}$) | Days Units (8) |

TABLE 27

Fill - ($D_{33}$-$D_{31}$ = '$010_B$')

| $D_{33}$ | $D_{32}$ | $D_{31}$ | $D_{30}$ | $D_{29}$ | $D_{28}$ | $D_{27}$-$D_0$ | |
|---|---|---|---|---|---|---|---|
| 0 | 1 | 0 | 0 | 1 | 0 | $AAAAAAA_H$ | $D2AAAAAAA_H$ |

TABLE 28

Overflow - ($D_{33}$-$D_{31}$ = '$011_B$')

| $D_{33}$ | $D_{32}$ | $D_{31}$ | $D_{30}$ | $D_{29}$ | $D_{28}$ | $D_{27}$-$D_0$ | |
|---|---|---|---|---|---|---|---|
| 0 | 1 | 1 | 1 | 0 | 1 | $5555555_H$ | $DD5555555_H$ |

Undefined - ($D_{33}$-$D_{31}$ = '$100_B$', '$110_B$', and '$110_B$') These undefined data bits provide capability for other enhancements. For example, these undefined codes could be used for embedding other PCM streams such as IRIG-106 Chapter 4 and 8 or other embedded user data such as digital voice or discretes.
Frame Sync - ($D_{33}$-$D_{31}$ = '$111_B$')

TABLE 29

OUTPUT 1 (LEADING FRAME)

| $D_{33}$ | $D_{32}$ | $D_{31}$ | $D_{30}$ | $D_{29}$ | $D_{28}$ | $D_{27}$-$D_4$ | $D_3$-$D_0$ | |
|---|---|---|---|---|---|---|---|---|
| 1 | 1 | 1 | 1 | 1 | 0 | 6B2840 | 0 | $FE6B28400_H$ |

TABLE 30

OUTPUT 2 (LAGGING FRAME)

| $D_{33}$ | $D_{32}$ | $D_{31}$ | $D_{30}$ | $D_{29}$ | $D_{28}$ | $D_{27}$-$D_4$ | $D_3$-$D_0$ | |
|---|---|---|---|---|---|---|---|---|
| 1 | 1 | 1 | 1 | 1 | 0 | 6B2840 | 1 | $FE6B28401_H$ |

The aforementioned encoding scheme provides flexibility to add other capabilities. For example, in a 40-bit PCM word format, the format may be the same as the 36 bit format noted above with the addition of four bits added at the beginning of the word in order to identify 64 FC inputs as opposed to the original 4 FC inputs noted above. It is contemplated that additional frame sync patterns may be added using the undefined bits in order to support more track splitting than the two track splitting described above. Alternatively or in addition, this encoding scheme using the undefined bits may be adapted to other networks such as Ethernet. The PEFC scheme may also be used to bundle the FCN data as a payload for any other type of protocol such as SCSI, TCP/IP, etc.

What is claimed is:

1. A system for interfacing with multiple nodes in a fibre channel network, the system comprising:
    at least one input interface configured to passively listen to multiple streams of data from the multiple nodes, the data formatted in accordance with a fibre channel (FC) protocol, each interface removing certain FC protocol words and filtering out unwanted data, yet still preserving entire FC frames; and
    an output interface configured to encode the filtered data and place the filtered data, including the encoded FC frames, from the multiple nodes into a single, lower speed stream;
    wherein removing certain FC protocol words includes not putting idle words into a PCM bucket; and inserting SOF and corresponding time words into the PCM bucket.

2. The system of claim 1, wherein at least one of the input interface and the output interface is further configured to time tag frames of the filtered data.

3. The system of claim 1, wherein the single stream is formatted for an avionics system.

4. The system of claim 1, wherein the single stream is formatted for a radar system.

5. The system of claim 1, wherein the single stream is formatted for data storage.

6. The system of claim 1, wherein the single stream is formatted for a telemetry device.

7. The system of claim 1, further comprising a processor coupled to control the input interface and the output interface.

8. The system of claim 7, wherein the processor is configured to program the input interface to receive frames of data.

9. The system of claim 7, wherein the processor is configured to program the output interface to fill PCM frames with a fill word when a frame of data is not available from the input interface.

10. The system of claim 1, wherein the FC frames are encoded in accordance with a pulse code modulated (PCM) protocol.

11. The system of claim 1, wherein unwanted data is filtered from certain source and destination nodes.

12. An aircraft comprising:
    a plurality of avionics units networked with a fibre channel network:
    a system for passively monitoring fibre channel network communications between the plurality of avionics units, removing certain FC protocol words and filtering out unwanted data, and placing the filtered data from the multiple units into a single, lower speed stream in a pulse code modulated (PCM) format; and
    a device for receiving the single stream of filtered data;
    wherein removing certain FC protocol words includes ignoring idle words and buffering FC data words and SOF words; and
    wherein time words are buffered with the SOF words.

13. The aircraft of claim 12, wherein at least one of the avionics units and the device includes a radar system.

14. The aircraft of claim 12, wherein the device includes a data storage device.

15. The aircraft of claim 12, wherein the device includes a telemetry device.

16. The aircraft of claim 12, wherein placing the filtered data from the multiple units into a single stream includes converting entire FC frames in the filtered data into PCM formatted frames.

17. The aircraft of claim 16, wherein placing the PCM formatted frames into a single stream includes merging first and second data streams of PCM formatted frames.

18. The aircraft of claim 17, wherein the formatted frames are time-tagged with at least two-hundred-fifty nanosecond resolution.

19. The aircraft of claim 17, wherein the method further comprises enabling and filtering the received data streams before the merging of the first and second data streams.

20. The aircraft of claim 17, wherein identification information is added to the PCM formatted frames.

21. The aircraft of claim 17, wherein packets of information are created from each of the first and second data streams.

22. The aircraft of claim 21, wherein the creating packets comprises:
capturing words of each of the data streams;
determining a content of each of the captured words; and
formatting each of the captured words according to its determined content.

23. The aircraft of claim 22, wherein the determining comprises determining whether each of the captured words is a control word or a data word, and wherein the adding comprises inserting a time indicator into the created packet relating to each of the determined control words.

24. The aircraft of claim 21, wherein the identification information comprises at least one of a sync pattern in each of the frames; an increment frame counter in each of the frames; a current time in each of the frames; and encoding information in each of the created frames.

* * * * *